(12) United States Patent
McClure et al.

(10) Patent No.: US 6,244,027 B1
(45) Date of Patent: Jun. 12, 2001

(54) ADJUSTABLE GROUND GAUGING ROLLER FOR WINDROW PICKUP ATTACHMENT

(75) Inventors: John R. McClure; William D. Hotaling, both of New Holland, PA (US)

(73) Assignee: New Holland North America, Inc., New Holland, PA (US)

( * ) Notice: Subject to any disclaimer, the term of this patent is extended or adjusted under 35 U.S.C. 154(b) by 0 days.

(21) Appl. No.: 09/426,500

(22) Filed: Oct. 26, 1999

(51) Int. Cl.$^7$ ..................................................... A01D 89/00
(52) U.S. Cl. .............................................. 56/364; 56/208
(58) Field of Search ...................... 56/11.9, 208, DIG. 1, 56/DIG. 11, 364, 322, 210, 214, 213; 172/466, 240

(56) References Cited

U.S. PATENT DOCUMENTS

| 3,589,116 | * | 6/1971 | Speiser ..................................... 56/249 |
| 3,633,345 | * | 1/1972 | Scarnato ................................. 56/14.1 |
| 3,638,405 | * | 2/1972 | Ferguson ................................ 56/10.4 |
| 3,755,998 | * | 9/1973 | Hoffmeyer .............................. 56/255 |
| 4,321,785 | * | 3/1982 | Kaland .................................... 56/17.2 |
| 4,495,756 |   | 1/1985 | Greiner et al. .......................... 56/364 |
| 5,086,847 | * | 2/1992 | Meiners ................................. 172/466 |

* cited by examiner

Primary Examiner—Thomas B. Will
Assistant Examiner—Árpád Fabian Kovacs
(74) Attorney, Agent, or Firm—John William Stader; Larry W. Miller

(57) ABSTRACT

An improved windrow pickup attachment for a forage harvester having a mechanism for processing crop materials including an input opening for receiving crop material. The attachment includes a main frame positioned on the front of the forage harvester adjacent the input opening. A transverse reel assembly and an auger conveyor are mounted on the main frame for picking up crop material from the ground, consolidating it and conveying it to the forage harvester base unit via the input opening. A ground gauging roller assembly supports the attachment to protect the reel during operation over uneven terrain. The assembly is adjustably mounted relative to the main frame.

10 Claims, 4 Drawing Sheets

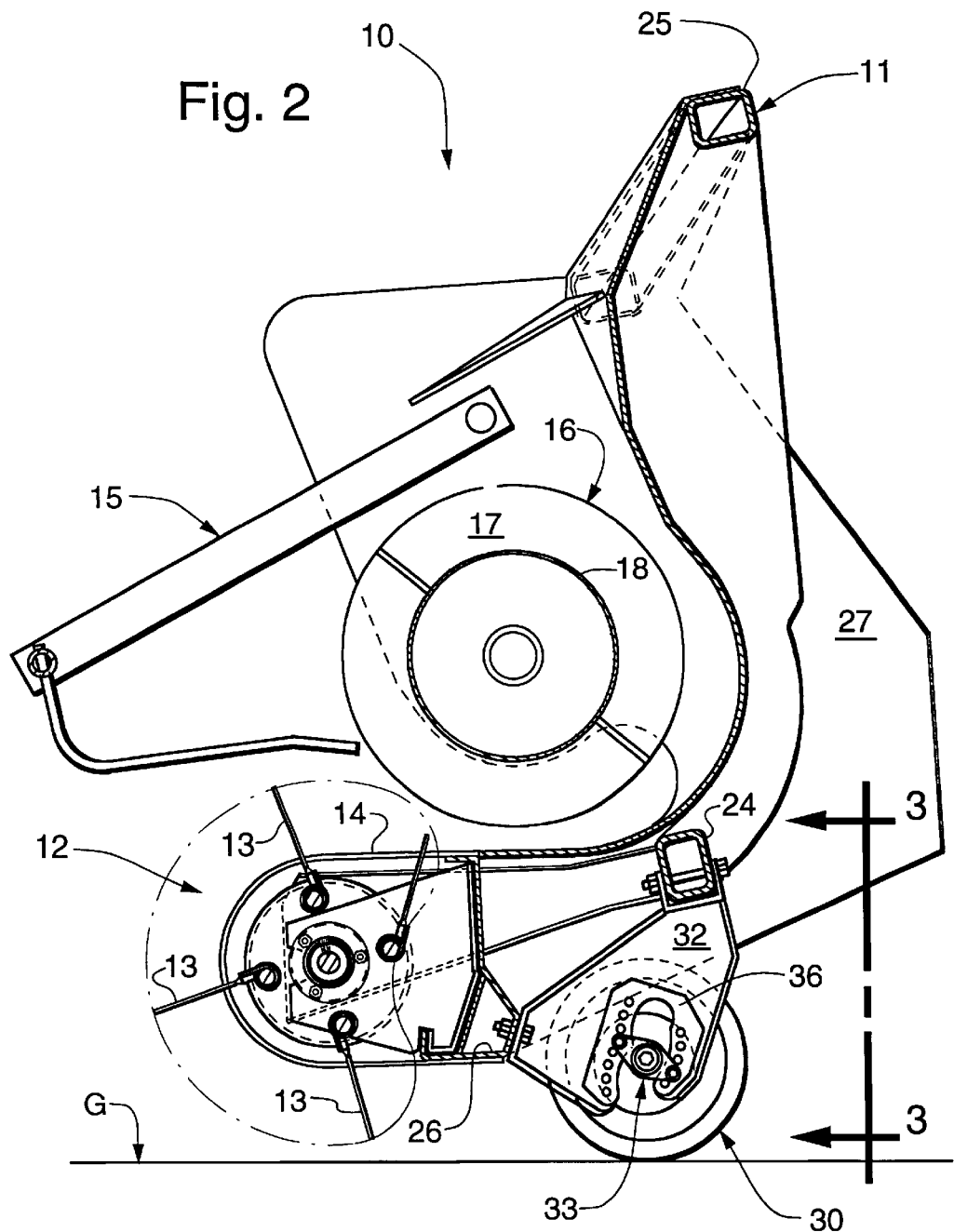

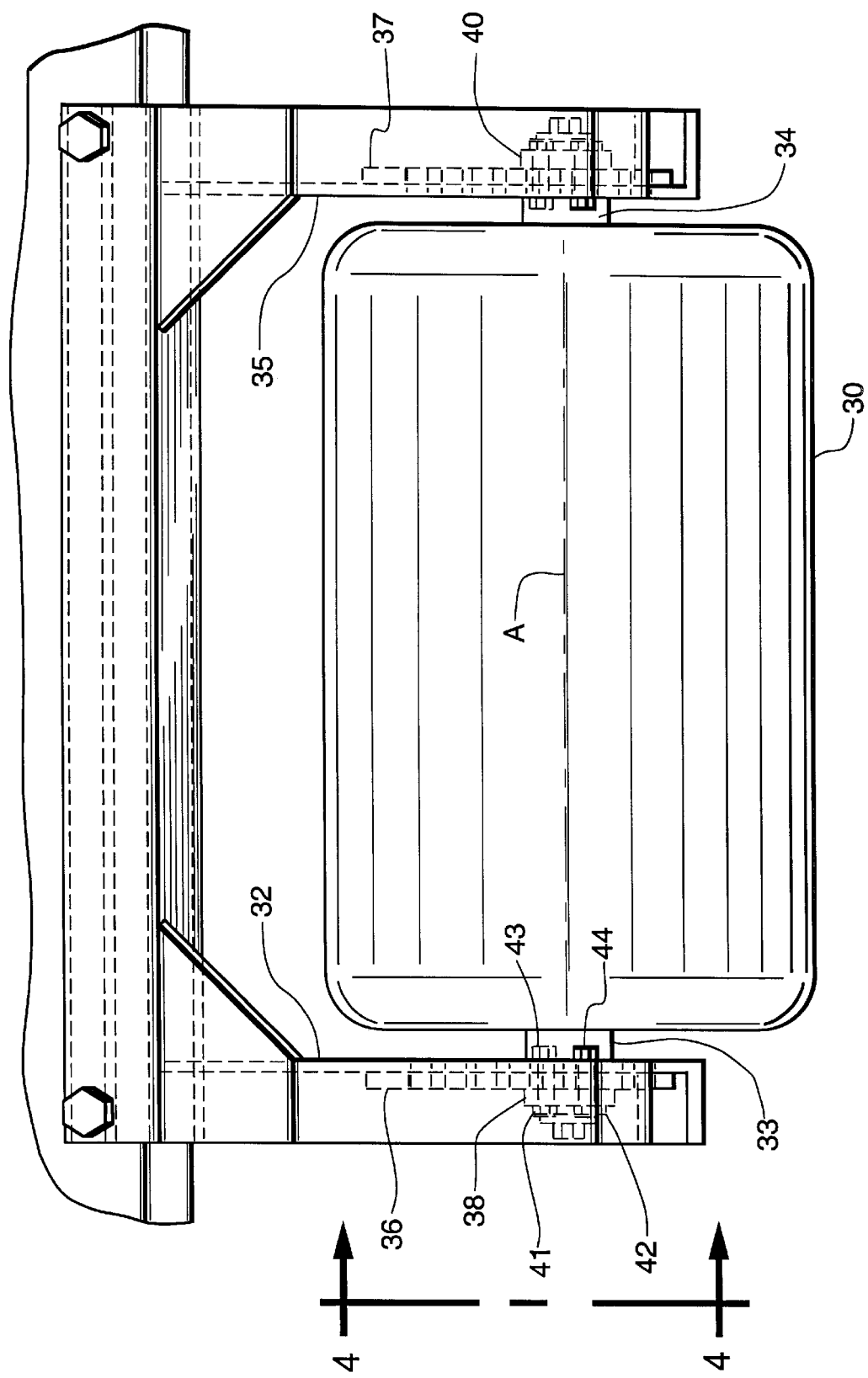

ADJUSTABLE GROUND GAUGING ROLLER FOR WINDROW PICKUP ATTACHMENT

FIELD OF THE INVENTION

The present invention relates generally to crop gathering headers for forage harvesting machines and more particularly to an improved mounting assembly for a ground gauging wheel.

BACKGROUND OF THE INVENTION

The well known agricultural practice of forage harvesting consists of cutting either green or mature crop material into discrete particles, and conveying the particles from the field to a storage facility, such as a silo. While in storage the crop material undergoes an acid fermentation to give the particles an agreeable flavor and to prevent spoilage. This overall operation, which is commonly referred to as an ensilage process, converts standing crop in the field to livestock feed, generally called silage.

An essential piece of farm machinery used for producing silage is the forage harvester which is adapted to gather standing or windrowed crop material from the field, chop it into small particles and then convey the cut crop material to a temporary storage receptacle, such as a wagon. Harvesters of this type are either self propelled or pulled by a tractor. Typically, forage harvesters comprise a base unit having a rotary cutter comprising a generally cylindrical configuration with knives peripherally mounted to cooperate with a stationary shear bar for cutting material by a shearing action as it is passed across the surface of the bar. The chopped crop material is then discharged from the harvester through a spout which directs the flow of crop material to a wagon towed behind or along side the harvester.

Forage harvesters, regardless of the type, i.e., both self propelled or pull type, have a crop gathering attachment that initially encounters crop material, as the harvester moves across the field. As mentioned above, the crop being harvested is either standing, such as rows of corn, or lying in the field, such as grass raked into a windrow. In the case of windrowed crop, a pickup attachment, extending from the front of the harvester, typically includes a reel consisting of a plurality of fingers, each of which is moveable through a predetermined path for engaging and picking up the windrowed crop material from the ground. The fingers urge the crop material rearwardly over side-by-side stripper plates, also commonly referred to as tine guards, that define slots through which the fingers extend. The stripper plates terminate in the general vicinity of a transverse auger that consolidates the crop material and feeds it through a rear opening in the header to an access opening in the base unit of the harvester, whereupon it is processed in the manner described above. A typical forage harvester windrow pickup attachment is shown in U.S. Pat. No. 4,495,756, issued on Jan. 29, 1985 in the name of J. G. Greiner, et al, hereby incorporated by reference.

In present day forage harvesters the pickup attachment is supported either by ground support means, the base unit to which it is attached, or a combination of the base unit and ground support means. Ground support techniques may consist of skid assemblies, wheels mounted on outrigger arm assemblies, rollers, or a combination of these approaches. Regardless of the support system employed, it is desirable to support the attachment a sufficient distance above the ground to prevent damage to the reel elements without having a deleterious affect on its ability to pick up the entire windrow.

During forage harvesting operations, varying stubble heights are encountered from day to day, and sometimes field to field, requiring a departure from the recommended minimum height at which the attachment normally operates. To this end, the present invention is directed to an improved windrow pickup attachment for forage harvesters having new and unique features for improving operating height adjustment capabilities.

SUMMARY OF THE INVENTION

One object of the present invention is to provide a forage harvester pickup attachment with a ground gauging roller having improved adjustment capabilities.

Another object of the present invention is to provide a forage harvester pickup attachment with a ground gauging roller assembly for incrementally adjusting operating height.

A further object of the present invention is to provide a forage harvester pickup attachment with an adjustable ground gauging roller assembly that is user friendly.

In pursuance of these and other important objects the present invention contemplates improvements to a windrow pickup attachment for a forage harvester having crop processing means. The attachment comprises a main frame positioned on the front of the forage harvester, and a transverse reel mounted on the main frame for picking up crop material from the ground. The reel includes a series of tines and a plurality of stripper plates, the tines projecting outwardly between the stripper plates for engaging crop material and urging it upwardly and rearwardly along the stripper plates. The attachment also includes a conveyor mounted on the main frame for receiving crop material from the reel along the stripper plates. The conveyor comprises an auger located rearwardly of the reel for consolidating crop material under conditions where it is urged rearwardly by the reel, and feeding it to the crop processing means. The attachment further comprises a gauging assembly for providing support for the pickup attachment. The gauging assembly comprises a roller having a transverse axis, journal means for mounting the roller for rotation about the transverse axis, and means for adjustably mounting the journal means relative to the main frame. More particularly, the invention is directed to means for adjustably mounting the journal means relative to the main frame. In this regard, first and second support means spaced from the axis conjointly support the roller. Means are provided for affixing the first support means in a first plurality of positions relative to the second support means to vary the position of the roller relative to the frame.

The foregoing and other objects, features and advantages of the invention will appear more fully hereinafter from a consideration of the detailed description that follows, in conjunction with the accompanying sheets of drawings wherein one principal embodiment of the invention is illustrated by way of example. It is to be expressly understood, however, that the drawings are for illustrative purposes and are not to be construed as defining the limits of the invention.

DESCRIPTION OF THE DRAWINGS

FIG. 2 is a cross sectional view taken in the direction of arrows 2—2 in FIG. 1.

FIG. 3 is a rear elevational view taken in the direction of arrows 3—3 in FIG. 2.

DESCRIPTION OF THE PREFERRED EMBODIMENT

Figure 1:
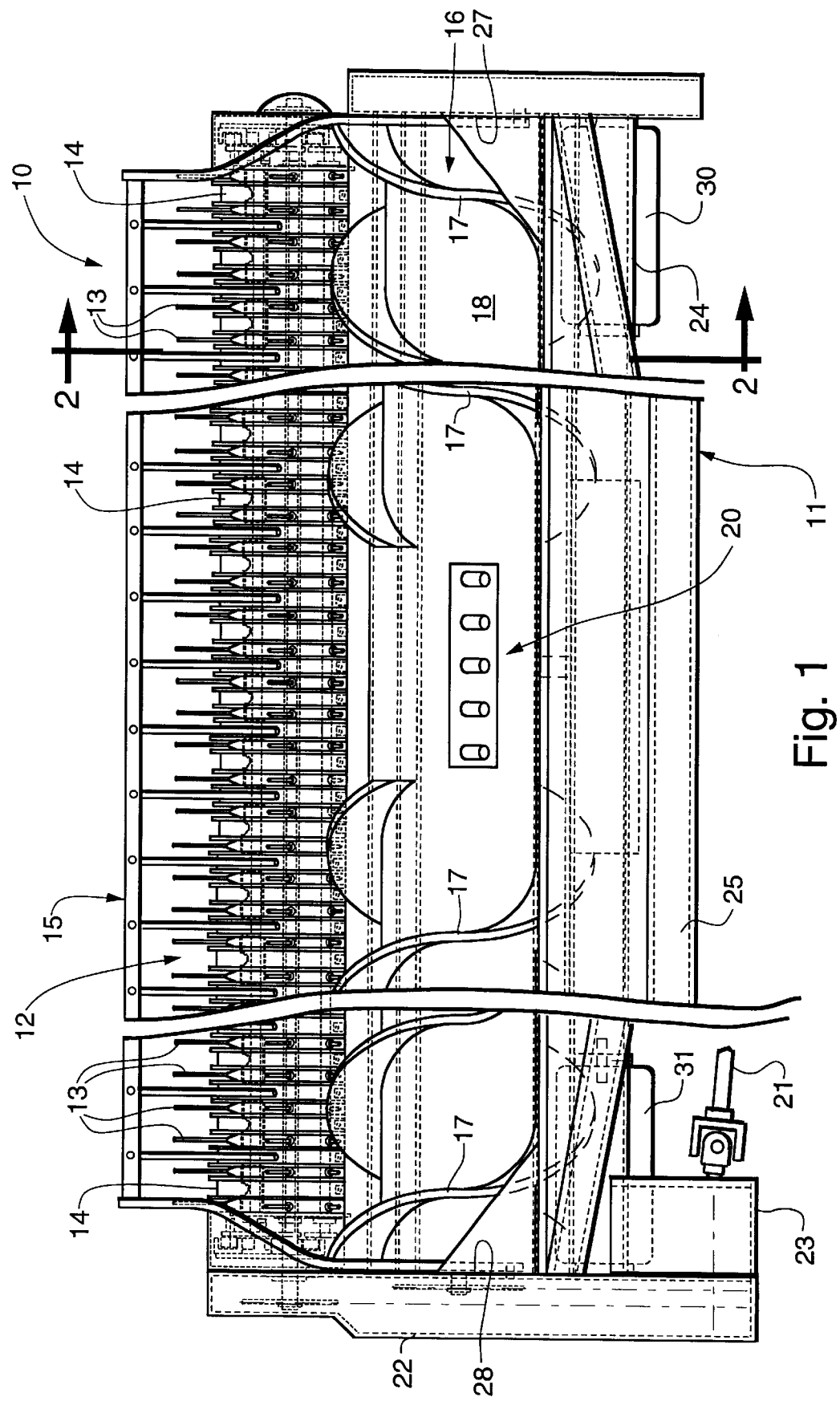
FIG. 1 is a plan view of a windrow pickup attachment for a forage harvester in which the preferred embodiment of the present invention is readily incorporated.

Referring now to the drawings for a more detailed description of the preferred embodiment of the present invention, FIGS. 1 and 2 show plan and elevational views of a windrow pickup attachment, generally referred to by reference numeral 10, that is readily adaptable for mounting on the front end of a forage harvester base unit, as illustrated in U.S. Pat. No. 4,495,756, referred to above. Additionally, it should be noted that to the extent that the structure of the present invention is directed to commonly known elements of a windrow pickup attachment for forage harvesting machines, the structure of the '756 patent is incorporated by reference.

Attachment 10 comprises a frame 11 (FIG. 2), having a conventional pick-up reel 12 (FIG. 2), mounted on the frame. Reel 12 comprises four sets of rotatable tines 13 operatively extending between stripper plates 14 for lifting windrowed crop material from the ground and urging it rearwardly over stripper plates 14 in a manner well known in the art. A wind guard 15 for restricting upward movement of the crop is pivotally mounted forward of an auger 16, also mounted on frame 11.

Auger 16 comprises flighting 17 extending from tube 18, and a centrally located retractable finger assembly 20 (FIG. 1). Auger 16 is operable to convey crop through a central opening in the rear wall of attachment 10 towards feed rolls (not shown) mounted in the vicinity of an input opening disposed on the face of the base unit (not shown) of the forage harvester on which the attachment is mounted. In a conventional manner, the feed rolls of the base unit receive the crop material conveyed through the opening and feed it to a rotating cutter assembly (also not shown) in the base unit for processing. Drive to reel 12 and auger 16 is accomplished via PTO 21 (FIG. 1) and conventional drive elements enclosed in housings 22, 23, (FIG. 1) some of which are shown in phantom outline.

It should be noted that flighting 17 of auger 16 comprises oppositely wound sections on the opposing ends of tube 18 for consolidating the gathered crop material at a central region of auger 16 under conditions where auger 16 is being rotated by drive elements also enclosed in housings 22, 23. Retractable finger assembly 20 includes a plurality of fingers disposed at the central region of auger 16 operable to project into the consolidated crop material and propel it rearwardly towards the abovementioned opening in the rear wall, whereupon feed rolls in the harvester base unit engage the crop and continue to convey it rearwardly as mentioned above.

Further, FIGS. 1 and 2 show main frame assembly 11, as comprising, inter alia, a transverse rear cross beam 24, a transverse upper cross beam 25, and a transverse lower cross beam 26 (also commonly referred to as a backbone cross beam), all of which are rigidly secured in place by opposing end wall structure 27 and 28. All the elements of the attachment, including reel 12, auger 16 and wind guard 15, are mounted on main frame assembly 11, which overall structure is supported on the ground by rollers 30, 31, (see FIG. 1) during operation. This support is augmented to a certain degree by the base unit of the harvester to which the attachment is secured in a cantilevered fashion. It should be pointed out that support of the attachment solely by the base unit would give rise to significant rotational forces leading to various problems, e.g., stress fracturing. Thus, it is common practice to provide primary support by means of ground engaging elements mounted on the attachment.

In some instances rollers are used in conjunction with gauge wheels, in which case, primary support is provided by the wheels, while the rolls are set above the ground to protect the reel elements. For example, if the tines are set 2 inches above the ground by adjusting the wheels, the gauge rolls will be set at only 1 inch of clearance to protect the tines when the attachment is operated over rough or uneven terrain. Also, in other instances where skid shoes are used in combination with rollers, the shoe or shoes are set above the rolls, i.e., the clearance for the shoes exceeds the clearance for the rollers.

Regardless of the combination of supporting and gauging elements used on attachments, adjustability of the gauging rolls is important. This has been recognized in prior art attachments, as illustrated in the '495 patent, referred to above. In the present invention, rollers 30 and 31 are both adjustable, but for the purposes of this description, only the system for mounting and adjusting roller 30 will be described, it being understood that a similar system is used to mount and adjust roller 31. A plurality of rollers could be utilized, in which case each additional roller would be mounted and adjusted in a similar manner.

Now referring in particular to FIG. 2, roller 30 is shown in contact with ground G while the path of the tips of tines 13 is spaced above the ground. This space can be varied by adjusting the position of roll 30 relative to support wall 32, which is secured to rear cross beam 24 and lower cross beam 26, both of which are integral elements of frame assembly 11.

Now turning to FIG. 3, roller 30, journal led in a pair of bearing housings 33, 34, is mounted between facing support walls 32, 35 on which mounting brackets 36, 37, respectively, are secured by conventional means, such as weldments. While these brackets are employed as a separate piece to reinforce and thus enhance rigidity of the structure, it is conceivable that the brackets and support walls could be designed, alternatively, as an integral element with suitable dimensions to provide adequate rigidity. The bearing housings 33, 34, in which roller 30 is rotatably mounted, are attached to mounting plates 38, 40, both of which are adjustably attached to mounting brackets 36, 37. Roller 30 rotates about its axis "A" in a conventional manner.

Figure 4:
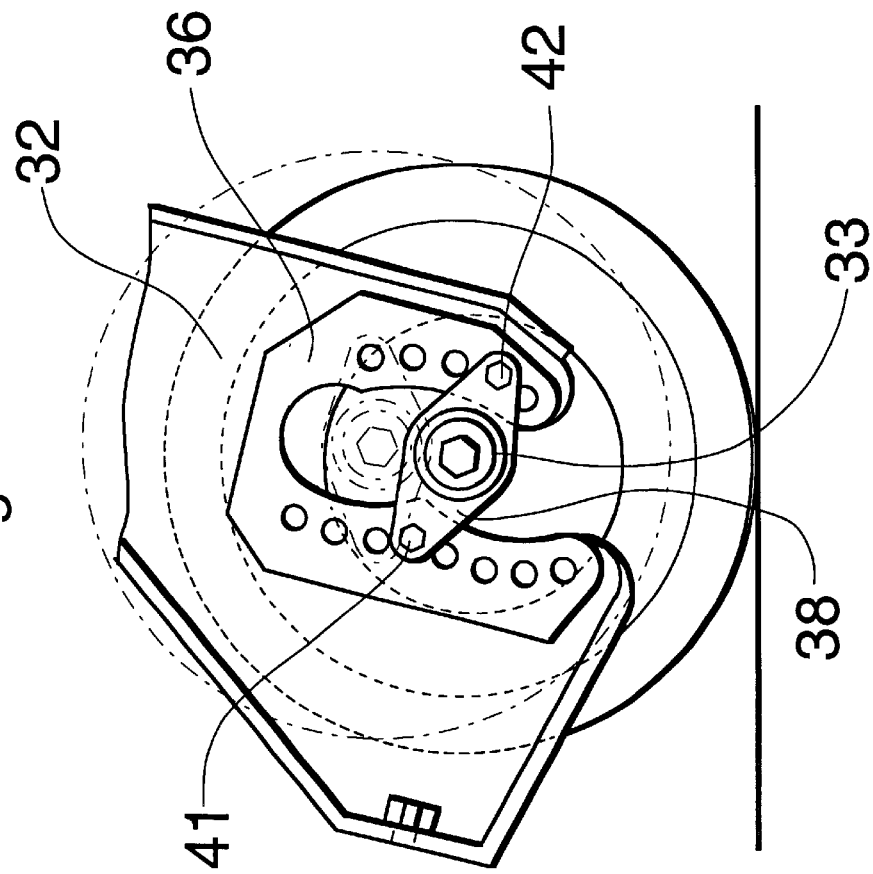
FIG. 4 is a side elevational view taken in the direction of arrows 4—4 in FIG. 3.

As shown in FIG. 4, front support bolt 41 and rear support bolt 42 each extend through one of the apertures in arrays of apertures to which they are operatively associated in mounting bracket 36. Whiz nuts 43, 44, disposed on the inside of support wall 32, secure the bolts in place to retain mounting bracket in an incremental position determined by aperture selection. Similar arrays of apertures are provided in opposing support wall 35, to accommodate a like pair of supporting bolts.

Figure 5:
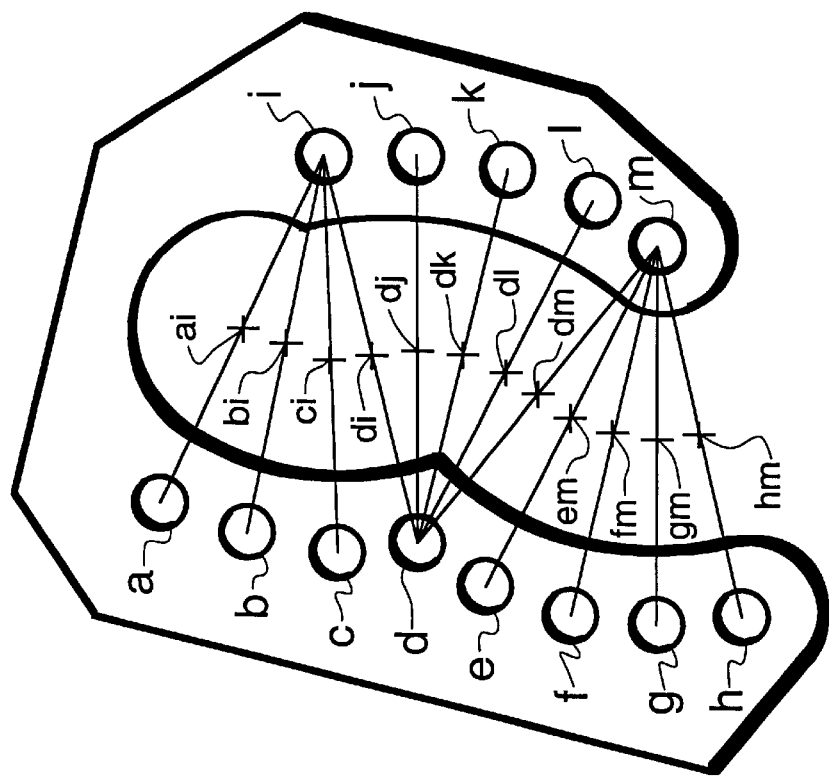
FIG. 5 is a schematic illustration showing the manner in which incremental adjustment of the gauging roller is achieved.

In operation, the axial position of roller 30 is adjustably affixed between mounting brackets 36, 37, in twelve incremental positions. Front support bolt 41 is secured to the bracket via apertures a through h, while rear support bolt 42 is secured to the bracket via apertures i through m. The twelve positions of axis "A" are identified in FIG. 5 by reference designations ai through hm, which refer to the incremental locations of the axis of roller 30, determined in the following manner. It is important to point out that the four distances between aperture i and apertures a, b, c, and d are identical. Likewise, the distances between aperture d and apertures i, j, k, l and m are identical, and the distances between aperture m and apertures d, e, f, g and h are identical. The fact that these twelve distances are all identical is at the heart of the present invention. Further, as mentioned above, there are two identical brackets and the above comment apply to both, as do the following comments relating to vertical adjustment of the roller. To this end, when the bracket and apertures therein are described with reference to adjustments, it should be assumed that similar procedures are carried out at both ends of the roller.

To illustrate the convenient and simple manner in which roller 30 can be adjusted between twelve incremental vertical positions designated by reference designations ai through hm, assume that mounting plate 38 is secured by its supporting bolts between apertures a and i. This is the uppermost position at which the roller can be secured between support walls 32, 35. By removing front support bolt 41 from aperture a and pivoting mounting plate 38 about rear mounting bolt 42 in aperture i, three additional incremental position of roller 30 are attainable, i.e., bi, ci and di. To attain the next four incremental positions, front supporting bolt 41 is retained in aperture d, and mounting plate 38 is pivoted to the next four positions dj, dk, dl and dm by varying the position of rear supporting bolt 42 in apertures j, k, l and m, respectively. Likewise, the four remaining incremental positions of shaft "A" are attained by pivoting mounting plate 38 about rear mounting bolt 42 in aperture m, to attain shaft positions em, fm, gm and hm.

During the above process a significant mechanical advantage is realized by virtue of the fact that the weight of the roller assembly is supported by the supporting bolt that remains in place while the mounting plate is pivoted to the next incremental location. In all prior art arrangements known to applicants, the weight of the entire assembly is manipulated during adjustment of the roller position, e.g., this is the case in U.S. Pat. No. 4,495,756, referred to above.

Of the many implicit and explicit advantages of the present invention, one considered to be very important is the manner in which most of the weight of the roll is supported during incremental changes of the roll position. Another equally as important advantage is the simplicity with which this improvement is accomplished without sacrificing structural integrity.

While the preferred structure in which the principles of the present invention have been incorporated is shown and described above, it is to be understood that the invention is not to be limited to the particular details, as shown and described above, but that, in fact, widely different means may be employed in the practice of the broader aspects of the invention.

Having thus described the invention, what is claimed is:

1. In an improved windrow pickup attachment for a forage harvester having crop processing means including an input opening for receiving crop material, said attachment comprising a main frame positioned on the front of said forage harvester adjacent said input opening, a transverse reel assembly mounted on said main frame for picking up crop material from the ground, said reel assembly including a series of tines and a plurality of stripper plates, said tines projecting outwardly between said stripper plates for engaging crop material and urging it upwardly and rearwardly along said stripper plates, a conveyor assembly mounted on said main frame for receiving crop material from said reel, said conveyor assembly comprising an auger located rearwardly of said reel for consolidating crop material under conditions where it is urged rearwardly by said reel, and means for feeding said consolidated crop material to said crop processing means via said input opening, and a gauging assembly for providing support for said pickup attachment, said gauging assembly comprising a roller having a substantially transverse axis, journal means for mounting said roller for rotation about said transverse axis, and means for adjustably mounting said journal means relative to said main frame, the improvement comprising said means for adjustably mounting said journal means relative to said main frame comprise first and second support means spaced from said axis for conjointly supporting said roller, a mounting bracket affixed to said main frame, said mounting bracket having first and second arrays of apertures for receiving said first and said second support means, respectively, and means for affixing said first support means in a first plurality of positions relative to said second support means to vary the position of said roller relative to said frame.

2. A windrow pickup attachment as set forth in claim 1 wherein
said first plurality of positions is defined by a like plurality of apertures in said first array of apertures for receiving said first support means.

3. A windrow pickup attachment as set forth in claim 2 wherein
said second support means is received by an aperture in said bracket that is equidistant from all of said like plurality of apertures in said first array for receiving said first support means.

4. A windrow pickup attachment as set forth in claim 3 wherein
said first support means is received by one of said first array of apertures in said bracket that is equidistant from all of said second array of apertures for receiving said second support means.

5. A windrow pickup attachment as set forth in claim 1 wherein
said means for adjustably mounting said journal means further comprise a mounting plate on which said journal means is located between said first and second support means, and said first and second support means comprise first and second pivot means, respectively, having first and second pivot axes, respectively, parallel to said transverse roller axis.

6. A windrow pickup attachment as set forth in claim 5 wherein said means for adjustably mounting said journal means further comprise
means for affixing said second pivot means in a second plurality of positions relative to said first pivot means.

7. A windrow pickup attachment as set forth in claim 5 wherein
said means for adjustably mounting said journal means relative to said main frame further comprise a mounting bracket affixed to said main frame, said mounting bracket having first and second arrays of apertures for receiving said first and said second pivot means, respectively.

8. A windrow pickup attachment as set forth in claim 7 wherein
said first plurality of positions is defined by a like plurality of apertures in said first array of apertures for receiving said first pivot means.

9. A windrow pickup attachment as set forth in claim 8 wherein said second pivot means is received by an aperture in said bracket that is equidistant from all of said like plurality of apertures in said first array for receiving said first pivot means.

10. A windrow pickup attachment as set forth in claim 9 wherein
said first pivot means is received by one of said first array of apertures in said bracket that is equidistant from all of said second array of apertures for receiving said second pivot means.

* * * * *